April 19, 1960
I. SLETTENMARK ET AL
2,933,627
ARRANGEMENT IN POWER TRANSMISSION NETWORKS
WITH DIRECTLY GROUNDED NEUTRAL
Filed March 5, 1956
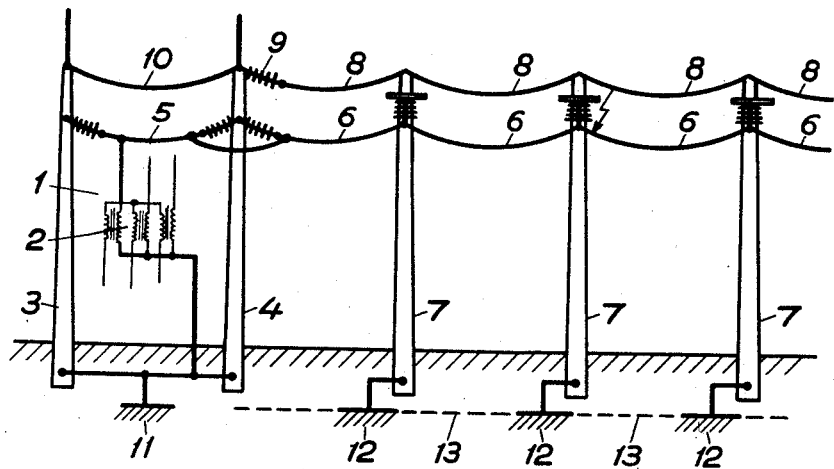
INVENTORS
Ivar Slettenmark, Bo Holmgren
and Lennart Winell.
BY
*Attorney.*

United States Patent Office 2,933,627
Patented Apr. 19, 1960

2,933,627

ARRANGEMENT IN POWER TRANSMISSION NETWORKS WITH DIRECTLY GROUNDED NEUTRAL

Ivar Slettenmark, Stockholm, Bo Holmgren, Hagersten, and Lennart Winell, Stockholm, Sweden, assignors to Allmanna Svenska Elektriska Aktiebolaget, Vasteras, Sweden, a corporation of Sweden Application March 5, 1956, Serial No. 569,650

5 Claims. (Cl. 307—147)

In power networks the neutral of the system is often directly grounded and the grounding net of the stations is performed for a grounding resistance as low as possible. Power lines, starting from the stations, are generally provided with ground connected wires, connecting the power line supporting poles with each other and with the station ground. The ground connected wires preferably consist of lightning screening overhead ground wires, mounted on and metallically connected with the power line poles. In certain cases the overhead ground wires are connected in parallel with counterpoise wires which are placed in the earth along the high voltage line. The grounding resistance of the supporting poles is usually higher than the resistance of the station grounding net, with the result that, on the occasion of flashover from the overhead ground wire to a phase conductor near a station, the greater part of the ground fault current passes through the overhead ground wires into the station and only a smaller part of the current passes through earth via the ground connections of the poles. Owing to the great ground fault currents, especially flowing near directly grounded stations, the overhead ground wires run the risk of being burned off if their area is not large enough. It has therefore been proposed, to install in certain cases coarser overhead ground wires near the stations, but the adoption of such a proposal might necessitate the reinforcement of the poles to withstand the increased mechanical stress. By these measures considerable costs would arise.

According to the present invention an electric unloading of the ground connected wires is obtained in directly grounded systems by the arrangement wherein, close to stations, the metallic connection between the grounding net of the station and at least some of the ground connected wires is permanently broken. This permanent separation is in the first place applied to the overhead ground wires of the power line and is preferably applied in such a way that the overhead ground wire is attached by insulating means to any of the power line poles close to the station. In those cases when a counterpoise is provided along the power line and when this is also exposed to the risk of burning off, its metallic connection with the grounding net of the station is also broken. By these measures the resistance of the ground fault circuit on occasion of ground fault near the station is increased, with the result that the current is reduced to a considerably lower value. Furthermore an improved dividing up of the current is obtained since a smaller part of the ground fault current finds its way back to the grounding net of the station via the ground connected wires of the power line.

The accompanying drawing shows the structure and the function of the arrangement. For the sake of clearness, only one phase of the high voltage system is drawn. A power line with phase conductors 6 starts from a station 1, comprising a transformer 2, the neutral of which is directly grounded and which transformer is connected to a busbar 5 mounted between the poles 3 and 4. On the power line poles 7 also one or more overhead ground wires 8 are located. These overhead ground wires are at the pole 4, by means of an insulating link 9, separated from the overhead ground wires 10 of the station which wires 10 are in turn metallically connected with the ground connection net 11 of the station. The power line poles 7 are grounded by means of the ground connections 12. These may be connected with each other by an earth wire 13.

It is presumed that a flash-over occurs from the overhead ground wire 8 to the phase conductor 6 in the neighbourhood of the station, for instance at one of the poles 7, and that the line is of normal design, having a certain ground resistance at the poles and another ground resistance in the station which resistance is at least one order of magnitude smaller than the former. If the overhead ground wires were not insulated from the station ground, as shown here, but in the usual way connected with the same, the greater part of the ground fault current, as mentioned above, would flow back to the station through the overhead ground wires. As the neutral of the transformer is then connected to the same grounding system as the overhead ground wires, these therefore would form a metallic closed return wire circuit for the ground fault current. Only a smaller part of the fault current would pass via the faulty pole and the nearest poles 7 to ground, especially if none or only a weakly dimensioned counterpoise wire connected them. If, on the other hand according to the invention, the metallic connection between the grounding net of the station and the overhead ground wire of the power transmission line is permanently broken, for example at the pole 4, the current will be divided up in a considerably more favourable way on account of the changed resistance conditions, since then a smaller part of the ground fault current will pass through the overhead ground wires. On account of the usually rather high individual pole resistances also the resulting transition resistance between overhead ground wire and ground will be considerably higher thereby limiting the magnitude of the total ground fault current.

When lightning strikes the overhead ground wire, transient waves with high amplitude may appear on it. For preventing flash-over across the insulated link 9, it is suitable that the insulation of the link in respect to earth at least corresponds to the insulation of the line. As normally no considerable power frequency voltage occurs across the insulating link 9, this can be carried out in a more simple way than usual. Instead of a ceramic insulator a nylon-wire, a glass fibre wire or a similar wire of insulating material can thus be used without inconvenience. The insulating link 9 need not necessarily be attached to the station pole 4 but may also be mounted at any of the line-poles 7 nearest the station.

As described above there are on certain power transmission lines not only overhead ground wires but also a counterpoise located in the earth and connecting the ground connections 12 of the different poles with the station grounding net 11. In such cases and especially if the counterpoise is weakly dimensioned, it may be suitable that also the metallic connection between the counterpoise wire and the ground connection net of the station is permanently broken.

We claim as our invention:

1. A power transmission network, the neutral of which is directly grounded, said network comprising at least one power line, the poles of which are connected together by ground connected wires, and said network comprising at least one station, said station being provided with a grounding system, the metallic connection between said grounding system and at least some of the ground connected wires being permanently broken close to the station.

2. A power transmission network, the neutral of which is directly grounded, said network comprising at least one power line, the poles of which are connected together by at least one overhead ground wire, and said network comprising at least one station, said station being provided with a grounding system, the metallic connection between said grounding system and said overhead ground wire being permanently broken close to the station.

3. A power transmission network, the neutral of which is directly grounded, said network comprising at least one power line, the poles of which are connected together by at least one counterpoise wire, and said network comprising at least one station, said station being provided with a grounding system, the metallic connection between said grounding system and said counterpoise wire being permanently broken close to the station.

4. A power transmission network, the neutral of which is directly grounded, said network comprising at least one power line, the poles of which are connected together by at least one overhead ground wire, and said network comprising at least one station, said overhead ground wire being insulatedly attached to a power line pole close to said station.

5. A power transmission network, the neutral of which is directly grounded, said network comprising at least one power line, the poles of which are connected together by at least one overhead ground wire, and said network comprising at least one station, said overhead ground wire being attached to a power line pole close to said station through a wire of insulating material.

References Cited in the file of this patent

UNITED STATES PATENTS 1,878,774    Griscom _____ Sept. 20, 1932

FOREIGN PATENTS 349,975    Germany _____ Apr. 12, 1921